US008704403B2

(12) United States Patent
Boerger et al.

(10) Patent No.: US 8,704,403 B2
(45) Date of Patent: Apr. 22, 2014

(54) POWER GENERATION SYSTEM COMPRISING A PLURALITY OF INVERTERS

(75) Inventors: Stefan Boerger, Kassel (DE); Peter Drews, Kassel (DE)

(73) Assignee: SMA Solar Technology AG, Niestetal (DE)

( * ) Notice: Subject to any disclaimer, the term of this patent is extended or adjusted under 35 U.S.C. 154(b) by 248 days.

(21) Appl. No.: 12/600,115

(22) Filed: Nov. 13, 2009

(65) Prior Publication Data

US 2011/0221269 A1 Sep. 15, 2011

Related U.S. Application Data

(63) Continuation-in-part of application No. PCT/DE2008/000541, filed on Mar. 28, 2008.

(30) Foreign Application Priority Data

May 14, 2007 (DE) .......................... 10 2007 022 879

(51) Int. Cl.
*H02J 1/10* (2006.01)
(52) U.S. Cl.
USPC ............... 307/18; 307/26; 700/286; 700/287; 700/288; 700/299
(58) Field of Classification Search
USPC ................. 307/18, 26; 700/286–289
See application file for complete search history.

(56) References Cited

U.S. PATENT DOCUMENTS

| 4,973,896 A | * | 11/1990 | Shiga et al. ..................... 322/28 |
| 2007/0271006 A1 | * | 11/2007 | Golden et al. ................ 700/295 |

FOREIGN PATENT DOCUMENTS

| EP | 1 047 179 A1 | | 10/2000 |
| EP | 1 580 862 A1 | | 9/2005 |
| EP | 1580862 A1 | * | 9/2005 |
| WO | 03/056671 A2 | | 7/2003 |

OTHER PUBLICATIONS

Mauch, K.; Power Electronic Interfaces for DER; First International Conference on the Integrated of RE and DER, Dec. 1-3, 2004.
Jahn, J. et. al; "Decentralized Power Generation: Further Development from Pure Power Feeding to an Intelligent System", NEuK (2006).
Meinhardt, M.; "Future Power-grid-related Linking of Photovoltaic Installations"; SMA Technologie AG; Apr. 24 2006.

* cited by examiner

*Primary Examiner* — Jared Fureman
*Assistant Examiner* — Alfonso Perez Borroto
(74) *Attorney, Agent, or Firm* — Eschweiler & Associates, LLC

(57) ABSTRACT

A power generation system for feeding power from generators into an AC grid, the system comprising a plurality of inverters connected to corresponding ones of the generators, and connected to the AC grid is disclosed. The plurality of inverters forms part of a data network, wherein one of the inverters forms a communication unit for receiving feed-in parameters from a grid control system and for controlling the plurality of inverters via the data network such that the power generation system feeds power to the AC grid in accordance with the feed-in parameters.

21 Claims, 4 Drawing Sheets

POWER GENERATION SYSTEM COMPRISING A PLURALITY OF INVERTERS

CROSS-REFERENCE TO RELATED APPLICATIONS

This application is a Continuation-In-Part of International Application No. PCT/DE2008/000541, filed Mar. 28, 2008, which was published in the German language on Nov. 20, 2008, under International Publication No. WO 2008/138288 A1 and the disclosure of which is incorporated herein by reference.

FIELD OF THE INVENTION

The invention relates to a power generation system for feeding power from a generator into an alternating-current power grid, in particular for such a system comprising a plurality of inverters.

BACKGROUND

In a power grid, power stations of significant power outputs are connected to higher-level power-control systems. Primarily, nuclear power plants, coal-fired power plants, gas-turbine power plants, hydroelectric power plants, that is, so-called large-scale power plants are interconnected.

Photovoltaic installations or, e.g., smaller combined heat and power stations deliver significantly less power in comparison with the mentioned power plants, so that the installations are not connected directly to a control system also due to their large number. The technical complexity of such a connection to a control system would be high, and the costs would be high. In this connection, refer to the following publications:
1. Mauch, K.: Power Electronic Interfaces for DER. First International Conference on the Integrated of RE and DER, Dec. 1-3, 2004, Brussels.
2. Jahn, J.; Reekers, J.; Meinhardt, M.: Decentralized Power Generation: Further Development from Pure Power Feeding to an Intelligent System, NEuK 2006.
3. Meinhardt, M.: Future Power-grid-related Linking of Photovoltaic Installations, Hannover, Apr. 24, 2006.

Photovoltaic installations deliver power outputs in the kW range, that is, significantly below the power output of large-scale power plants. Due to the rising number of such installations, feeding electrical energy from photovoltaic installations represents an increasing control problem for energy control systems. Predictions for energy contributions from these installations cannot be made precisely, because the generation of energy is dependent, for example, on solar radiation or general weather influences. Large-scale power plants, in particular, base-load power stations, can rarely react to greatly changing conditions. Therefore, a need exists for a simplified control system for the feeding of electrical power into a grid by a plurality of relatively low power output installations such as photovoltaic installations. For example, if base-load power stations are shut down, then starting them up again takes a relatively long amount of time. It is known that feeding power from photovoltaic installations has great variability. It can happen, for example, that there is no need for photovoltaic power in a power grid outside of peak times. Indeed, electrical storage devices, in particular, accumulators, are often used in photovoltaic installations as buffers, but this procedure is relatively expensive and the buffer capacities are limited. On the other hand, unused solar energy is undesirable, because it significantly reduces the cost efficiency of an installation.

Furthermore, photovoltaic installations and other installations for generating renewable power, such as small wind turbines, are positioned far away from each other.

SUMMARY OF THE INVENTION

A power generation system is disclosed for feeding power from generators into an AC grid. The system comprises a plurality of inverters connected to corresponding ones of the generators, and is connected to the AC grid. The plurality of inverters forms part of a data network, wherein one of the inverters forms a communication unit for receiving feed-in parameters from a grid control system and for controlling the plurality of inverters via the data network such that the power generation system feeds power to the AC grid in accordance with the feed-in parameters.

In a further embodiment, an inverter is described for feeding power into an alternating-current power grid, wherein the inverter can be connected on the input side to a generator generating electrical energy. The inverter comprises a data connection to a data network, wherein the data network comprises a plurality of additional inverters with additional power generators for feeding power into the alternating-current power grid. The data network forms a communication unit with at least one inverter, wherein at least one of the inverters acts as a master and forms a control unit for the communication unit with a plurality of additional inverters operating as slaves. Through the control unit, the communication unit is controlled so that a power generation system is provided that is uniform with respect to feed-in parameters and that is connected in a power grid as an external unit with an integrated inspection and control structure.

Two or more of the inverters of the power generation system may be configured to take the role of the communication unit. The system may be configured to autoselect one of the inverters as the communication unit, and as well may be configured to reselect another inverter as communication unit, for example in case of a failure of the inverter selected as communication unit before, thereby becoming a backup communication unit.

The power generation unit may comprise generators such as a fuel-cell power generator, a battery system, a biomass power plant, a combined heat and power plant, an internal combustion engine generator, a wind turbine, a hydroelectric generator, a gas-turbine generator, or a photovoltaic generator.

The data network between the inverters may be formed by a wired connection or a wireless connection, e.g. a radio, a WLAN or a Bluetooth connection, among others.

In a further aspect of the invention, an inverter for feeding power into an alternating-current power grid that can be connected on the input side to a generator generating electrical energy has a data connection to a data network, wherein the data network comprises a plurality of additional inverters with additional power generators for feeding power into the alternating-current power grid, wherein the data network forms a communication unit with one inverter, wherein, as a master, the one individual inverter forms a control unit for the communication unit with the plurality of additional inverters working as slaves, wherein, through the control unit, the communication unit is controlled so that a power generation system is provided that is uniform with respect to feed-in parameters and that is connected to a power grid as an external unit with an integrated inspection and control structure.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings several embodiments. It should be understood, however, that the invention is not limited to the precise arrangements and instrumentalities shown.

With reference to the embodiment, the invention will be explained in greater detail below as an example.

In the drawings:

FIG. 1 is a schematic diagram of an Ethernet backbone solution for interlinking individual radio and wired power plants and power plant clusters;

FIG. 2 is a schematic diagram of radio interlinked solar inverters; and

FIG. 3 is a schematic diagram of several wire-interlinked solar inverters with radio-based coupling to the Internet.

FIG. 4 is a block diagram illustrating a multi-inverter power generation system in accordance with one embodiment.

DETAILED DESCRIPTION OF THE INVENTION

Figure 1:
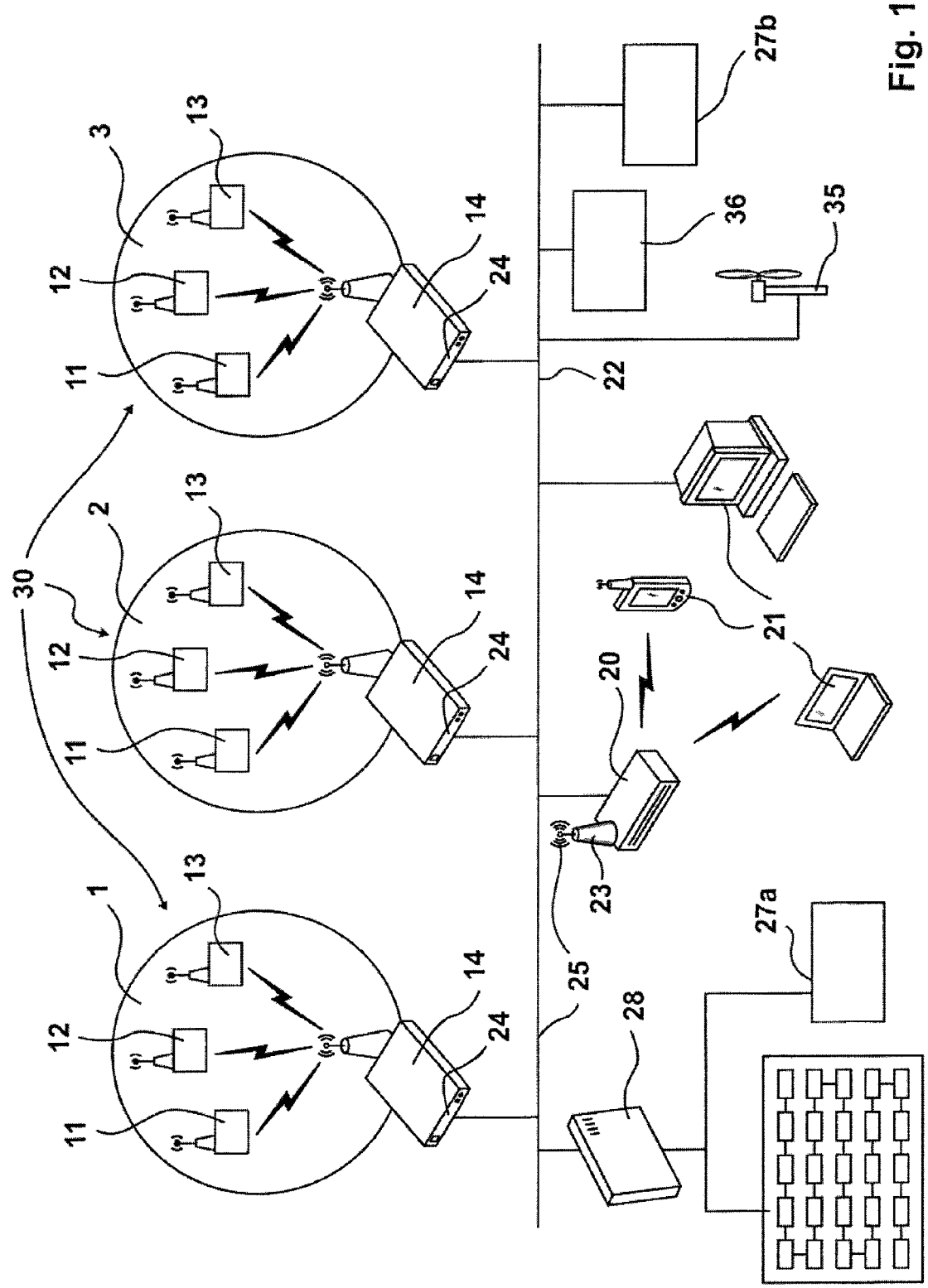

The invention involves the idea of integrating decentralized power-generating installations that deliver a relatively small power output into a uniform power plant by interlinking inverters with each other through data communication. In this way, one inverter in the communication unit, for example a higher-level inverter, operates as a master and the other inverters, e.g. arranged at lower levels than this inverter, are operated as slaves. If the inverter operating as the master fails, another inverter, such as the next inverter that is arranged hierarchically underneath in the data network formed by the inverters takes over the role of master.

Such master-slave solutions are reliable and have been tested in practice in numerous fields of use. The special feature of network communication in the inverter according to an aspect of the invention involves that both the role of the individual network subscribers as master or slave and also the integration into a communication network is automatically selected by the power generation system, i.e. without manual or external intervention being needed.

In contrast to the state of the art cited above, the individual power-generating installations are integrated into a "power plant component" and the control takes place internally within the communication unit, wherein the other inverters are controlled by the inverter operating as a master. Only this one master inverter is controlled from the outside and receives feed-in parameters from an external grid control system, other than the state of the art, where each of the individual inverters would have to be separately controlled.

Interlinking of the inverters is possible with relatively little complexity. Additional modules are not needed, because the interfaces for data communication can be arranged in an inverter housing. This also has the advantage of shorter control paths for semiconductors present in the inverters, which allows quick-acting control of the inverter.

Commands of a higher-level control system can be constructed optimally, in that, through internal data communication of the inverters, optimum parameter adjustments are set. For example, different power-generating installations interlinked with each other could also be adapted through internal data communication to the requirements of the power grid, so that the best-possible utilization, for example, of solar current, is given.

It is also possible to reduce the capacity of electrical storage devices that are relatively expensive. For example, a maximum feed-in of solar power is achieved, in that a higher priority is given to the solar power, so that, for example, hydroelectric power plants that are used in a power grid as peak-load power stations, could maintain a power reserve for later use.

Through the invention, not only is an optimum utilization of power possible, but also an efficient stabilization of the power grid can be achieved by controlling the semiconductor inverters.

The interlinking of the power feeders with communication means, allows to generate the needed "local intelligence" through continuous data exchange, which allows the power feeders to be integrated into a uniform power generation system.

It is also possible to form an additional inspection element for an interface made available in the data network or power feeding grid, wherein this element is then in the position to also take over complex control and regulation tasks. This is advantageous for a structure with many different power generators.

One advantage of the invention is that the control of a power generation system comprising a plurality of generators can be realized without an external higher-level control system, such as a grid control system. The advantageous utilization of the invention allows a provision of feed-in parameters that a master or communication unit of the power plant can implement for the whole power generation system via the data network with all of the inverters of the system. The operation of the power generation system in accordance with the feed-in parameters could be one of the control tasks of the communication unit.

The communication unit could be constructed, for example, in a simple way for the phase-symmetric feeding, for operating in a work range that is optimum for the entire installation, by storing excess power in electrical storage devices, in particular accumulators, for reducing power output, in particular with reference to frequency statistics, for separating non-efficient power generators, and for compensation through generators with power reserves.

The communication unit according to the invention allows the operator of electrical power-generating installations, such as power plants or other power feeders, to adapt the feeding power of its power-generating installation to the requirements as represented by feed-in parameters of a power grid. This is advantageous when the power plant is formed by several individual generators or inverters. As a consequence, power feeders appear as a uniform power generation system to the outside. This is achieved in that the individual inverters in a power generation system are automatically connected to each other in a data network by the inverters according to the invention.

Such a power generation system described here can be made from a plurality of feeders of the following type, in particular, at least one photovoltaic installation for feeding power, at least one fuel-cell power generator, battery systems with power feeders or inverters, at least one biomass power plant, at least one combined heat and power plant, at least one aggregate based on an internal combustion engine for generating power that could be portable or also stationary, as well as at least one wind-power turbine or wind-power converter for feeding power, at least one hydroelectric generator for feeding power, and/or at least one gas-turbine generator for feeding power. One advantage of the invention is that such a power generation system comprising several individual feeders could be built heterogeneously from a mix of some or all of the listed energy generator types. This mix from different power-generating installations could also be incorporated through suitable gateways (interfaces with local intelligence/microprocessor for protocol conversion) into the network of the communication unit. These gateways advantageously control the different specific types of communication or control with the different power generators.

To be able to perform such adaptations to external requirements, it is useful when the power plant is prepared for certain events and can identify these events and also react to these events with short reaction times. Such events are, in particular, an increased power demand in the power grid that requires, for example, a maximum output power of the power generation system, a reduced power demand in the power grid that causes a limited, adapted output power of the power plant, a demand for a symmetric feeding on the three phases in a three-phase system, an evaluation of a load distribution, and an adaptation of individual feeders in a feed-in power, so that the power generation system as a whole performs symmetric feeding and/or can compensate for a failure of other individual power plants of the power grid, or a connection to other individual power plants is realized for connecting to an automatic integration.

Through the integration of power feeders with relative small power output into a single, uniform power generation system, the control of the individual inverters can then take place by a higher-level control system, even if an individual generator connected to the individual inverter according to the invention delivers practically no significant contribution to the power supply. Thus, the new, decentralized power plant based, in particular, predominantly on renewable energy, such as a wind turbine, gas-turbine power plant of large power output, a large-scale power station based on fossil fuels, or a nuclear power plant can be incorporated into the power grid. Through the plurality of feeders, the required feed-in power is achieved.

It is also favorable that, in this way, a high-quality energy contribution and thus higher sales prices can be achieved by the power plant. The invention allows to deliver a peak load in a very short time or to deliver relatively expensive power. Therefore, in the extreme case, even an interruption in the power grid could be prevented. Thus, in a very short time, a plurality of accumulators could be connected as feeders and energy stored in buffer capacitors of the inverters could even be dissipated very quickly to the power grid, so that, for example, a short-circuit defect in the grid can be bridged within milliseconds. A chain reaction and a large-area grid failure, as has already happened in the USA and Canada, could be prevented under some circumstances. In this way, the power-supply reliability is increased.

In addition, electrical energy from, for example, photovoltaic installations, can be stored by means of the electrical storage devices, which can be set by a higher-level control system. Often it is known in advance, namely from statistical inquiries of energy demand, for example, after certain events, such as, after a halftime pause after an important soccer game or the well-known midday consumption peaks. For example, the storage devices could then be completely charged, when such a requirement peak is to be covered. The invention delivers a significant contribution to energy management.

It is recognized that all of the feeders that are integrated into the power plant as suggested by the invention form a uniform communication unit that is then in the position to request and buffer, for example, actual values, parameters, and status reports from the feeders, to receive target values, commands, and parameters from higher-level controllers and to forward these items to the feeders in a suitable way, to use suitable interfaces, especially Ethernet, RS485, Controller Area Network (CAN) or Industrial Scientific and Medical (ISM) band data radio interfaces for communication with each other or with other feeders belonging to the power plant or also to create communication with a local control system for the power plant, to provide communication with super-regional control systems for whole power plant clusters, as well as to allow communication with substantially any data portals via the Internet.

In one advantageous refinement of the inverter, at least one generator is a photovoltaic generator. Advantageously, a plurality of photovoltaic generators is interlinked to form a power plant. Photovoltaic generators exhibit predominantly a relatively low power and may be constructed for an individual building. For example, photovoltaic modules are mounted on a roof of a house. The available surface area is limited. Therefore, the power output is also low, for example, relative to a nuclear power plant. If large numbers of households are interlinked to form a power plant, then a significant power contribution can be fed into the power grid in a controlled way.

It is also advantageous when at least one power generator is a fuel-cell power generator, a battery system, a biomass power plant, a combined heat and power plant, an internal combustion engine generator, a wind turbine, a hydroelectric power plant, and/or a gas-turbine generator of low power. Through the interlinking and communication of the different generator types, the energy management can be further improved. Through the data communication, for example, a bad-weather region passing by can be taken into account, in that its direction is taken into account and from this a prediction on power generation is created. Power distribution and its change can be integrated in a simple way in a corresponding data set. Such a prediction is very advantageous for energy management of a higher-level control system. The linking of the power plant comprising individual, possibly different types of feeders can be performed through any data portal.

In another construction of the invention, the data connection is at least partially a radio connection. Such a radio connection is possible in a simple way through known transmission techniques, such as ISM radio Bluetooth/WLAN, ZigBee, Z-Wave, NanoNet, EnOcean. Through the radio transmission, a plurality of generators can be interlinked. In addition, relatively wide distances can also be bridged.

The data connection could also be constructed partially or completely as a wired connection, for example when the inverter is connected to the Internet. Such a cable connection is relatively noise-free. A wired interlinking of the inverters can be based, for example, on RS485, Ethernet, CAN technology.

Preferably, the data network is connected to a higher-level controller, in particular, to a local or super-regional control system, wherein the higher-level controller transmits target values, commands, and/or parameters to the network comprising inverters. By connecting to the control system, the power management can be improved.

In another refinement of the invention, actual values, parameters, and/or status reports are stored in the communication unit. Therefore, a query of status information, measurement values, and/or diagnostic information can be performed at a single point at any time. The storage of data allows the higher-level control system to be able to access certain data at any time, in order to be able to make decisions. Such a decision could be, for example, the reduction or increase of the power output of a coal-fired power plant in the associated feeder power grid.

Analyses could be further improved if measurement value sensors are connected to the data network. In particular, there could be secondary devices, local data loggers, measurement devices for detecting meteorological data, such as temperatures, solar radiation, wind velocity, etc., and/or devices for the electronic detection of counter states.

It is favorable that a transmission of control commands, parameter changes, and/or operating software for the power generators is performed. By transmitting this data, an update can be performed in an automated way. Through the communication network, the individual generators shares information from the other units and thus advantageously can make conclusions on system diagnostics and operating optimization.

In the figures, similar parts are provided with the same reference symbols.

FIG. 1 illustrates an Ethernet backbone solution for inter-linking individual radio and wire-interlinked power plants or power generation systems 1, 2, 3.

Each power plant unit 1, 2, 3 is made from a plurality of inverters 11, 12, 13, 14 for feeding power into a now-shown alternating current power grid. As representatives for additional energy-generating installations in the communication network, a wind turbine 35 and a hydroelectric power plant 36 are drawn here. Other of those already mentioned types of power plants could coexist in the communication network. Between the inverters 11 to 14 there is a data connection that can be a cable connection or, for example, a Bluetooth connection. Each inverter is connected on the input side to an electrical-power-generating photovoltaic generator. As the example shows, several power plant units 1, 2, 3 can be integrated to form a single power generation system. However, a power generation system may as well just consist of a single power plant unit 1, 2, 3. As is to be understood, even other generators, such as a wind turbines 35 and hydroelectric power plants 36 may be comprised in the power generation unit. In general, any of the components of the power generation system may take the role of the communication unit. As an aspect of the invention, there is a data connection to a data network. The inverter 14 is constructed as a master, wherein the inverters 11, 12, and 13 operate as slaves. Here, the inverter 14 forms the control unit for the inverters operating as slaves. Each master of each power plant unit 1, 2, 3 is connected to a WLAN router 20 to which communication devices 21, such as PC's, laptops, PDA's can be connected.

The data network comprises cable connections 22 and radio connections 23 that create a data connection 25. Among the inverters 11 to 14, the data network establishes a communication path. Through the data connections 25, control commands, parameter changes, and/or operating software for the photovoltaic generators or the inverters can be transmitted.

The individual inverters 11 to 14 are controlled by a communication unit 24 via the data connection 25, so that there is a uniform power plant unit 30 with respect to feed-in parameters. The unit 30 is then connected in a power grid as a uniform unit with integrated inspection and control structure. In this setup, the power plant unit 30 forms the power generation system.

The data network formed by the data connection 25 shown in FIG. 1 may be connected to the Internet and in this way connected to a higher-level controller, in particular, to a local or super-regional grid control system. The higher-level controller transmits target values, commands, and/or parameters to the network formed by inverters 11 to 14. Each inverter 11 to 14 comprises means for communication with the other inverters. In these inverters, actual values, parameters, and/or status reports are stored.

Furthermore, the data network may be connected to measurement value sensors 27a, 27b that are connected directly or indirectly by a data logger 28 (see FIG. 1).

Data can also be transmitted from the control system to the power-plant unit 30, so that this system is suitable for a bidirectional transmission of data packets, in particular, according to a network routing method.

Figure 2:
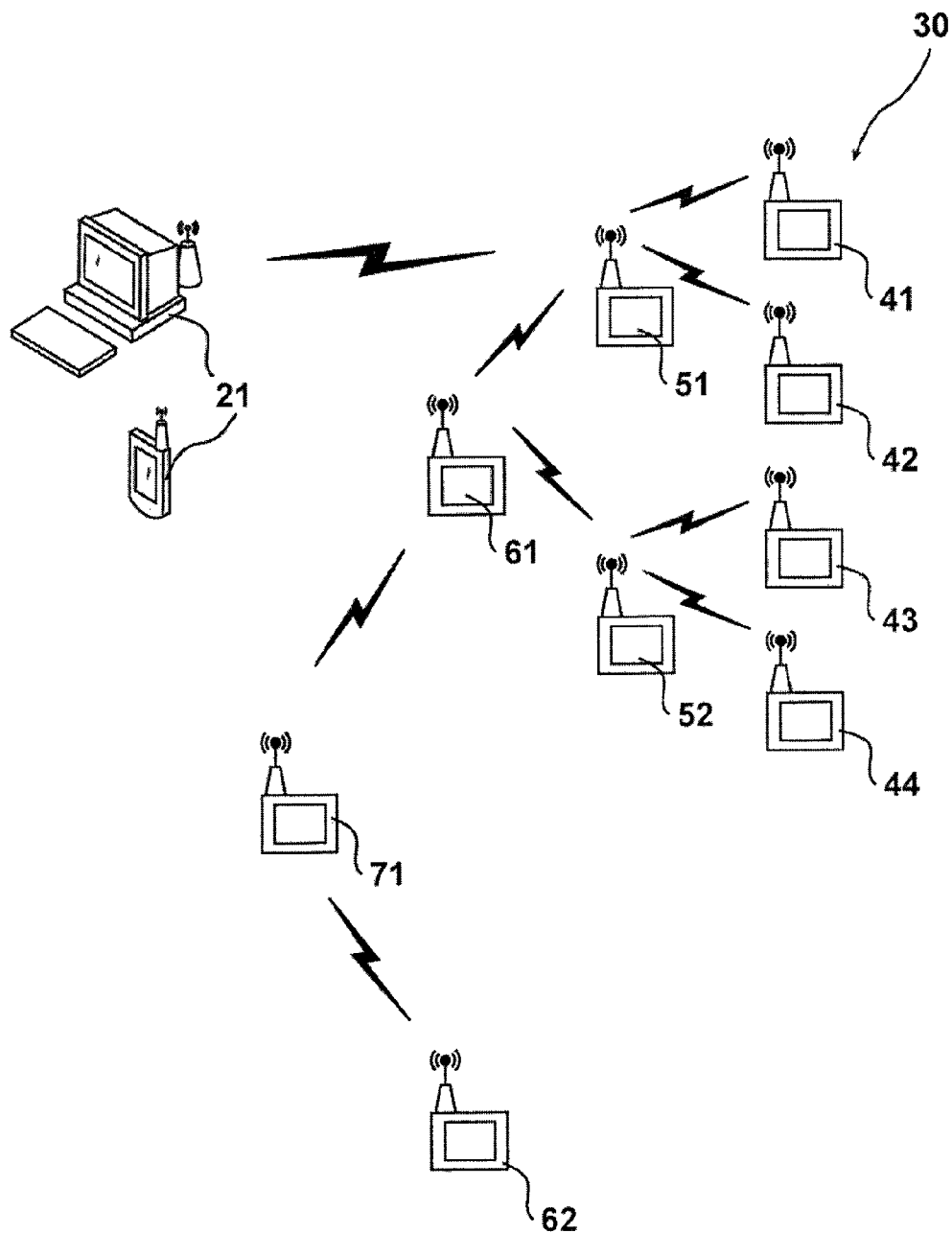

FIG. 2 shows a variant with solar inverters with a radio connection and a tree structure. The inverters 41 and 42 are arranged below the inverter 51 that operates as a master for both. The inverters 43 and 44 are arranged below the inverter 52 that also operates as a master for these two. The inverters 51 and 52 are arranged below the inverter 61. Both inverters 61, 62 that operate as masters for the corresponding lower-level inverters are also connected for communication with the inverter 71 in a master-slave relationship. A communication device 21 is connected to the inverter 51.

All of the inverters 41 to 71 shown in FIG. 2 form the power plant unit 30 with their generators. Between the inverters 41 to 71 there is a radio data connection.

Figure 3:
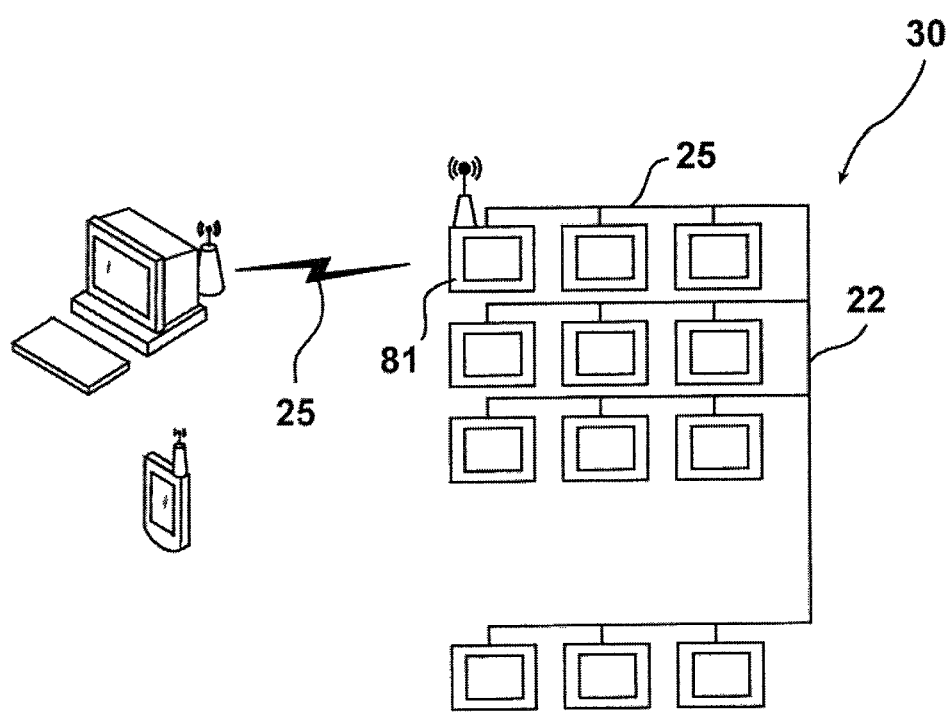

In FIG. 3, a wire-interlinked solar inverter 81 is shown. This is connected with a cable connection to other inverters. The solar inverter 81 is connected via radio, in particular, by means of WLAN, to the Internet. The cable connection 22 connects, like a bus, all of the inverters to each other for communication. With its photovoltaic generator, each inverter forms a feeder. The plurality of feeders creates the power-plant unit.

Each solar inverter is constructed as a DC/AC inverter. It can be connected via 100 inverters to the data network, wherein each power generator advantageously delivers a nominal power in the region of 1 kW to 100 kW.

Figure 4:
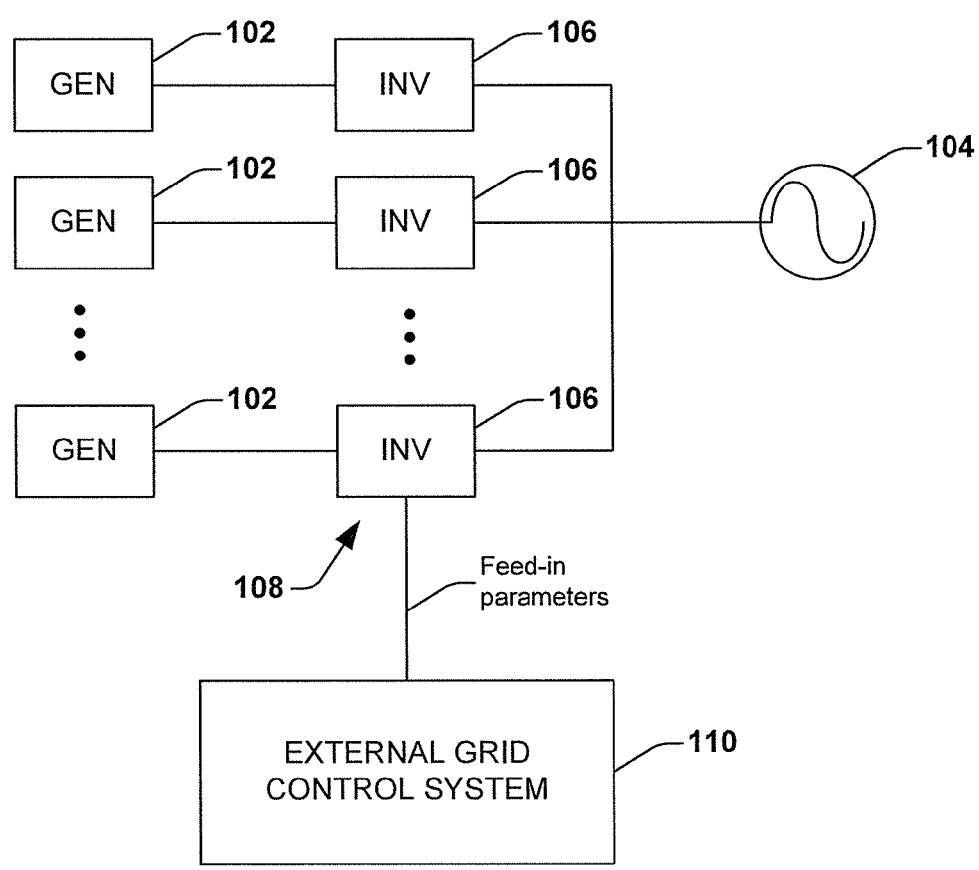

FIG. 4 is a block diagram of a multi-inverter power generation system 100 for feeding power from generators (GEN) 102 into an AC grid 104. The system 100 comprises a plurality of inverters (INV) 106 that connect to corresponding generators 102 and also connect to the AC grid 104. One of the inverters 106 forms a communication unit 108 that is configured to receive feed-in parameters from an external grid control system 110.

The invention is not limited to this example, for example, instead of solar generators, accumulators, wind turbines, could also serve as feeders. What is important is the linking of individual feeders that act as an integrated power plant, so that external inspection and control structures of the power-supply companies are simplified. Other solutions could also be used in which the individual inverters are oriented toward higher-level power goals for the optimal operation of the composite power plant or unit 30.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A power generation system for feeding power from generators into an AC grid, the system comprising a plurality of inverters configured to connect to corresponding ones of the generators, and configured to connect to the AC grid, the plurality of inverters forming part of a data network, wherein one of the inverters forms a communication unit configured to receive feed-in parameters from an external grid control system and control the plurality of inverters via the data network such that the power generation system feeds power to the AC grid in accordance with the feed-in parameters when the power generation system and the AC grid are connected thereto, wherein the external grid control system is external to the plurality of inverters.

2. The power generation system of claim 1, wherein the one of the inverters is configured as a master, and the respective other ones of the inverters are configured as slaves.

3. The power generation system of claim 1, wherein in case of a failure of the one of the inverters, the power generation system is configured to select another one of the inverters as a backup communication unit.

4. The power generation system of claim 1, wherein at least two of the plurality of inverters are configured to act as the communication unit.

5. The power generation system of claim 1, wherein each inverter of the plurality of inverters is configured to act as the communication unit.

6. The power generation system of claim 1, wherein the generators comprise one of the group of a photovoltaic generator, a fuel cell, a battery system, a biomass power unit, a combined heat-power unit, a combustion engine, a wind turbine, a hydroelectric generator, and a gas turbine.

7. The power generation system of claim 1, wherein the data network comprises a radio connection.

8. The power generation system of claim 1, wherein the data network comprises a wired connection.

9. The power generation system of claim 1, wherein the communication unit is connected to the Internet or a wide-area network for receiving the feed-in parameters.

10. The power generation system of claim 1, wherein the communication unit is configured to convert the feed-in parameters into operation commands for controlling individual ones of the plurality of inverters, and to transmit the operation commands to the corresponding inverter, thereby controlling the operation of the corresponding inverter so as to feed power to the AC grid in accordance with the feed-in parameter.

11. The power generation system of claim 1, wherein the system is configured to automatically select one of the plurality of inverters as the communication unit.

12. The power generation system of claim 1, further comprising an energy storage device.

13. The power generation system of claim 12, wherein the power generation system is configured to direct energy generated by the plurality of inverters into and out of the energy storage device so as to feed power to the AC grid in accordance with the feed-in parameters.

14. The power generation system of claim 1, wherein each of the plurality of inverters is configured to deliver a nominal power between 1 kW and 100 kW.

15. An inverter for feeding power into an alternating-current power grid, wherein the inverter is configured to connect on an input side thereof to a generator generating electrical energy, the inverter comprising: a data connection to a data network, wherein the data network comprises a plurality of additional inverters with additional power generators for feeding power into the alternating-current power grid, wherein the data network forms a communication unit with at least one inverter, wherein at least one of the inverters as a master forms a control unit for the communication unit with a plurality of additional inverters operating as slaves, and wherein, through the control unit, the communication unit is controlled so that a power plant unit is provided that is uniform with respect to feed-in parameters that are received from a power grid as an external unit with an integrated inspection and control structure, wherein the external unit is external to the inverter and the plurality of additional inverters.

16. The inverter according to claim 15, wherein at least one generator is a photovoltaic generator.

17. The inverter according to claim 15, wherein at least one generator is a fuel-cell power generator, a battery system, a biomass power plant, a combined heat and power plant, an internal combustion engine generator, a wind turbine, a hydroelectric generator, a gas-turbine generator, and/or another photovoltaic generator.

18. The inverter according to claim 15, wherein the data connection is constructed at least partially as a radio connection.

19. The inverter according to claim 15, wherein the data connection is constructed at least partially as a wired connection.

20. The inverter according to claim 15, wherein the data network is connected by the inverter operating as a master to a higher-level controller, in particular to a local or super-regional grid control system, wherein the higher-level controller transmits target values, commands, and/or parameters to the network comprising the plurality of additional inverters.

21. The inverter according to claim 20, wherein a slave takes over the master role when the master fails.

* * * * *